US012671340B2

(12) United States Patent
Atmur et al.

(10) Patent No.: US 12,671,340 B2
(45) Date of Patent: Jun. 30, 2026

(54) DC-TO-DC CONVERTERS AND METHODS FOR DETERMINING OUTPUTS OF THE SAME

(71) Applicant: The Boeing Company, Arlington, VA (US)

(72) Inventors: Robert J. Atmur, Whittier, CA (US); Michael J. Bianchi, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 422 days.

(21) Appl. No.: 18/311,060

(22) Filed: May 2, 2023

(65) Prior Publication Data

US 2024/0372479 A1     Nov. 7, 2024

(51) Int. Cl.
    *H02M 3/335*       (2006.01)
    *H02M 1/00*       (2006.01)
(52) U.S. Cl.
    CPC ..... *H02M 3/33569* (2013.01); *H02M 1/0009* (2021.05); *H02M 3/33515* (2013.01)
(58) Field of Classification Search
    CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262;

G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045;

(Continued)

(56) References Cited

U.S. PATENT DOCUMENTS

| | | | | |
|---|---|---|---|---|
| 4,149,233 A | * | 4/1979 | Frosch | H02M 7/493 |
| | | | | 363/71 |
| 4,937,725 A | * | 6/1990 | Dhyanchand | H02M 1/34 |
| | | | | 363/56.05 |

(Continued)

*Primary Examiner* — Crystal L Hammond
*Assistant Examiner* — Nusrat Quddus
(74) *Attorney, Agent, or Firm* — Hanley, Flight & Zimmerman, LLC

(57) ABSTRACT

Example DC-to-DC converters are described herein. An example DC-to-DC converter includes an input connected in series with an output. The input is to be connected to a voltage source and the output is to be connected to a load. The DC-to-DC converter also includes a first switch connected in series with the input and the output, a second switch connected in parallel with the output, a first current sense transformer connected in series the first switch, a second current sense transformer connected in series with the second switch, and a switching controller to determine an estimated output current at the output based on the measurements from the first and second current sense transformers.

20 Claims, 6 Drawing Sheets

(58) Field of Classification Search

CPC ........ H02M 7/006; H02M 7/06; H02M 7/068;
            H02M 7/153; H02M 7/10; H02M 1/088;
            H02M 7/103; H02M 7/106; H02M 7/19;
                H02M 7/08; H02M 7/17; H02M
            2001/007; H02M 7/493; H02M 7/53806;
             H02M 7/5381; H02M 7/483; H02M
            7/217; H02M 7/538466; H02M 7/5387;
            H02M 7/53871; H02M 7/53873; H02M
            7/53875; H02M 1/084; H02M 1/0845;
              H05B 39/048; B23K 11/24; H04B
              2215/069; H02J 3/46; H02J 3/38
    See application file for complete search history.

(56)                 References Cited

U.S. PATENT DOCUMENTS

| | | | | |
|---|---|---|---|---|
| 4,952,848 | A * | 8/1990 | Erhardt | H05B 41/2885 |
| | | | | 315/307 |
| 5,654,881 | A * | 8/1997 | Albrecht | H02M 3/28 |
| | | | | 363/25 |
| 2004/0232899 | A1* | 11/2004 | Herbert | H02M 3/1584 |
| | | | | 323/282 |
| 2012/0099348 | A1* | 4/2012 | Umetani | H02M 3/158 |
| | | | | 363/37 |
| 2016/0028304 | A1* | 1/2016 | O'Day | H02M 1/4233 |
| | | | | 363/89 |
| 2017/0331363 | A1* | 11/2017 | Travaglini | H02M 3/158 |
| 2018/0062523 | A1* | 3/2018 | Rainer | H02M 3/33507 |
| 2019/0348918 | A1* | 11/2019 | Ojika | H02M 3/1588 |
| 2020/0091821 | A1* | 3/2020 | Sagona | H02M 3/1588 |
| 2021/0194380 | A1* | 6/2021 | Tamada | H02J 3/16 |
| 2024/0348049 | A1* | 10/2024 | Horton | H02M 3/33584 |

* cited by examiner

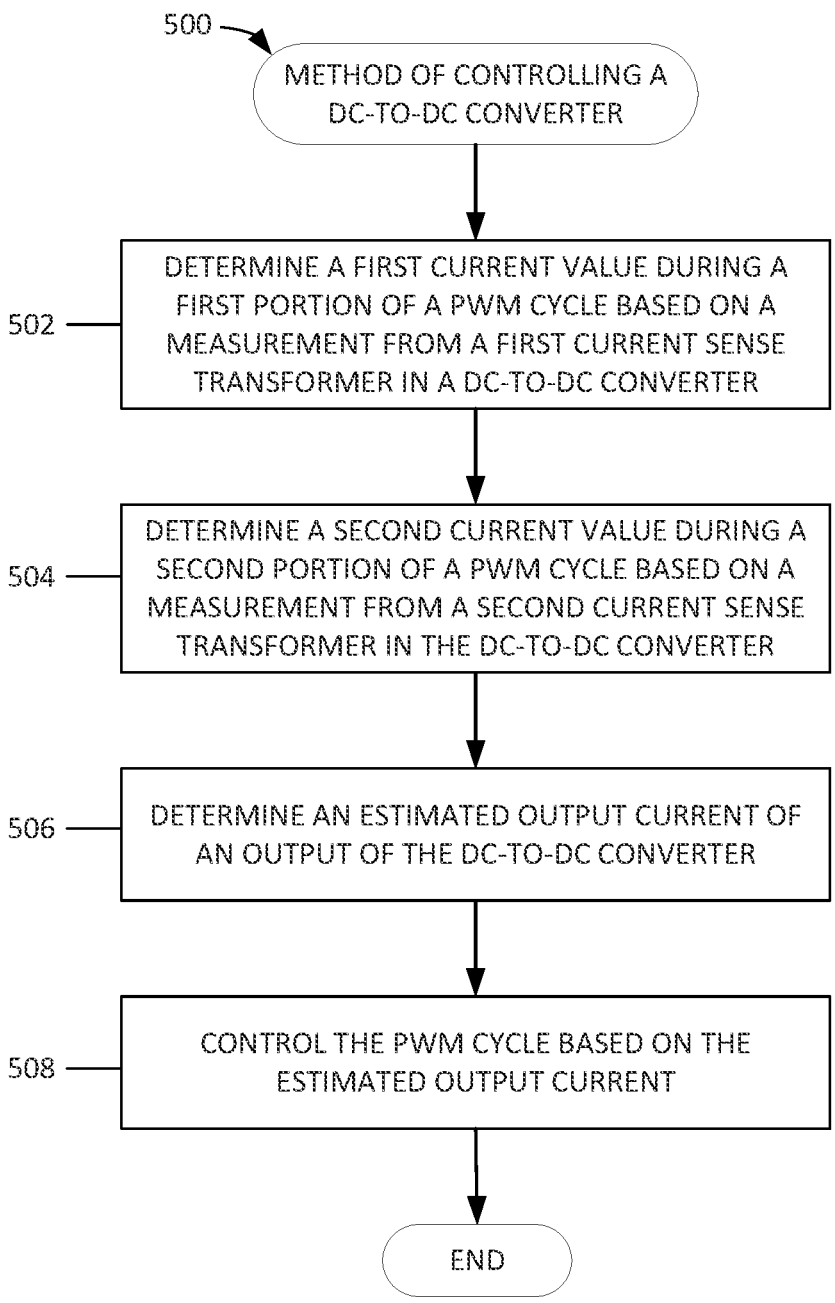

500

```
┌─────────────────────────────┐
│   METHOD OF CONTROLLING A    │
│     DC-TO-DC CONVERTER       │
└─────────────────────────────┘
```

502 ─

```
┌─────────────────────────────────────────┐
│ DETERMINE A FIRST CURRENT VALUE DURING A  │
│ FIRST PORTION OF A PWM CYCLE BASED ON A   │
│ MEASUREMENT FROM A FIRST CURRENT SENSE    │
│ TRANSFORMER IN A DC-TO-DC CONVERTER       │
└─────────────────────────────────────────┘
```

504 ─

```
┌─────────────────────────────────────────┐
│ DETERMINE A SECOND CURRENT VALUE DURING A │
│ SECOND PORTION OF A PWM CYCLE BASED ON A  │
│ MEASUREMENT FROM A SECOND CURRENT SENSE   │
│ TRANSFORMER IN THE DC-TO-DC CONVERTER     │
└─────────────────────────────────────────┘
```

506 ─

```
┌─────────────────────────────────────────┐
│ DETERMINE AN ESTIMATED OUTPUT CURRENT OF  │
│   AN OUTPUT OF THE DC-TO-DC CONVERTER     │
└─────────────────────────────────────────┘
```

508 ─

```
┌─────────────────────────────────────────┐
│   CONTROL THE PWM CYCLE BASED ON THE      │
│        ESTIMATED OUTPUT CURRENT           │
└─────────────────────────────────────────┘
```

```
┌──────────┐
│   END    │
└──────────┘
```

FIG. 5

DC-TO-DC CONVERTERS AND METHODS FOR DETERMINING OUTPUTS OF THE SAME

FIELD OF THE DISCLOSURE

This disclosure relates generally to power supplies and, more particularly, to DC-to-DC converters.

BACKGROUND

DC-to-DC converters are used to convert direct current (DC) voltage from one voltage to another DC voltage. For instance, some DC-to-DC converters are configured to reduce or step down voltage from a relatively high input voltage to a lower output voltage. DC-to-DC converters are used in many environments and applications. For example, DC-to-DC converters are used in many electronic devices to regulate the voltage between a power source (e.g., a battery) and a low voltage component (e.g., a sensor, a light, etc.) in the electronic device.

SUMMARY

An example DC-to-DC converter disclosed herein includes an input connected in series with an output. The input is to be connected to a voltage source and the output is to be connected to a load. The DC-to-DC converter includes a first switch connected in series with the input and the output, a second switch connected in parallel with the output, a first current sense transformer connected in series the first switch, a second current sense transformer connected in series with the second switch, and a switching controller to determine an estimated output current at the output based on measurements from the first and second current sense transformers.

A non-transitory machine readable storage medium disclosed herein includes instructions that, when executed, cause programmable circuitry to: determine a first current value based on a measurement from a first current sense transformer in a DC-to-DC converter, determine a second current value based on a measurement from a second current sense transformer in the DC-to-DC converter, and determine an estimated output current of the DC-to-DC converter based on the first current value and the second current value.

An example aircraft disclosed herein includes a power supply, a load, and a DC-to-DC converter including a circuit to reduce a voltage between the power supply and the load, and a switching controller to: determine a first current value of a current flowing in the circuit in series with the load, determine a second current value of a current flowing in the circuit in parallel with the load, and determine an estimated output current of the circuit based on the first current value and the second current value.

BRIEF DESCRIPTION OF THE DRAWINGS

FIG. 5 is a flowchart representative of example machine readable instructions and/or example operations that may be executed, instantiated, and/or performed by example programmable circuitry to implement an example switching controller of FIGS. 2 and 3 to control or regulate the example DC-to-DC converter.

In general, the same reference numbers will be used throughout the drawing(s) and accompanying written description to refer to the same or like parts. The figures are not necessarily to scale.

DETAILED DESCRIPTION

Figure 1:
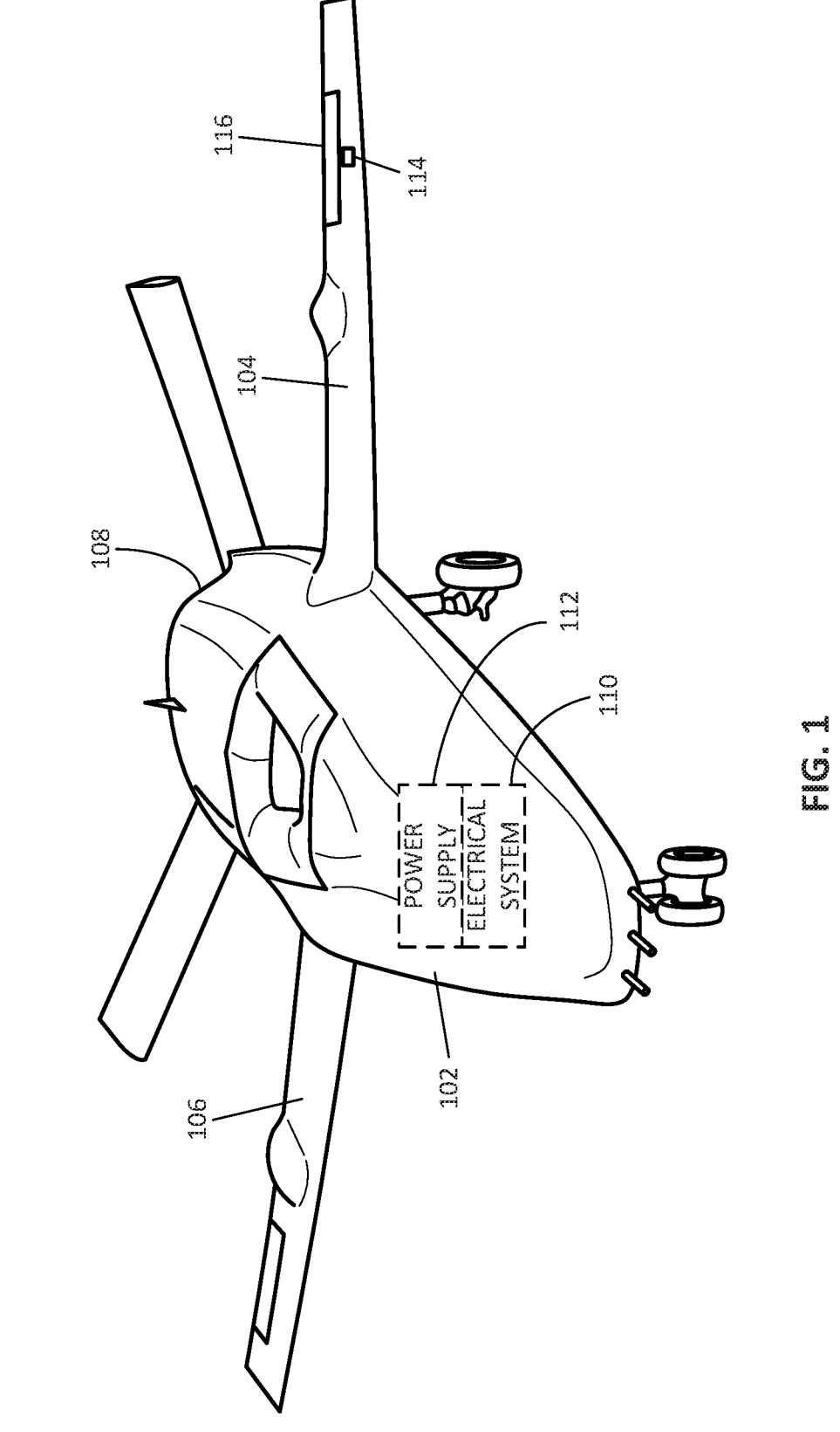
FIG. 1 illustrates an example aircraft in which the example DC-to-DC converters disclosed herein can be implemented.

Disclosed herein are example DC-to-DC converters for converting an input voltage to a different output voltage. In particular, the example DC-to-DC converters disclosed herein are step-down converters (sometimes referred to as a buck converter) that reduce a higher input voltage to a lower output voltage. In some examples, the example converters are used for high voltage applications. For example, an example DC-to-DC converter can be used to step-down or reduce the voltage from a high voltage source, such as 300V, to a lesser voltage, such as 270V. The example DC-to-DC converters can be used in any type of power supply system or electrical system where it is desired to reduce a voltage between two points.

In known DC-to-DC converters, controlling or even sensing the current in the converter is typically accomplished by an inline current-sense resistor or Hall effect sensor. These types of sensors are directly connected in the converter circuit. Problems arise with this type of arrangement when the input voltage (supply) is required to be operated in an overloaded or shorted condition for a period of time without damage to the converter. For example, to meet certain reliability requirements, it is often required for a converter to be able to withstand a shorted output and/or a high current overload condition such as 150-400% of the maximum nominal load. However, with these types of overloads, the inline resistors are often overloaded and fail. Further, these types of sensors are complex to implement, require additional space and supporting circuitry in the overall topology, and require additional power or biasing to operate.

Disclosed herein are example DC-to-DC converters that utilize two current sense transformers to measure or sense the current in the DC-to-DC circuit at two specific locations. For example, the first current sense transformer is connected in series with a first (primary) switch of the circuit, and the second current sense transformer is in series with a second (recirculating) switch of the circuit (which is in parallel with the output). The first and second current sense transformers are used to measure or determine the current levels at these two locations. The DC-to-DC converter includes an example switching controller that determines or estimates the total output current of the circuit based on these two measurements, which can then be used to control or limit the output current and voltage of the DC-to-DC converter. The summed and accumulated current measurements from the first and second transformers represent an approximation of the converter's output current waveform that, and when combined with a suitable Pulse Width Modulation (PWM) controller or programmable circuitry, can be used to implement an output current-limited DC-to-DC converter topology.

The current sense transformers are advantageous because they are galvanically isolated from the input voltage supply. As such, use of the current sense transformers is more reliable than known types of sensors that are not isolated from the input voltage supply and because current sense transformers are passive devices. In particular, current sense transformers are passive devices and do not require activation power or biasing. Thus, current sense transformers have high reliability and have minimal losses, compared to inline resistive based sensing methods as well as hall effect sensors, which require additional power biasing. As such, the example current sense transformers are easier and less expensive to implement and operate. Further, use of current sense transformers can improve the efficiency of the DC-to-DC converter.

FIG. 1 illustrates an example aircraft 100 in which the example DC-to-DC converters disclosed herein can be implemented. In this example, the aircraft 100 is an unmanned aerial vehicle (UAV). However, the example DC-to-DC converters disclosed herein can similarly be implemented in connection with manned aircraft and/or electric vehicles. In the illustrated example, the aircraft 100 includes a fuselage 102, a first wing 104 coupled to the fuselage 102, and a second wing 106 coupled to the fuselage 102. In the illustrated example, the aircraft 100 includes an engine that is installed in the fuselage 102 and produces thrust at an aft end 108 of the fuselage 102. In some examples, the engine can be implemented by a gas-driven engine, such as a turbojet engine. In other examples, the engine may be an electrically-powered engine. In some examples, the aircraft 100 can include more than one engine and the engine(s) can be disposed in other locations (e.g., on the wings 104, 106).

The example aircraft 100 includes a power supply 112 and an electrical system 110 that distributes or provides power from the power supply 112 to one or more components on the aircraft 100. For example, the first and second wings 104, 106 have one or more flight control surfaces, such as flaps, ailerons, slats, spoilers, etc. In some examples, these flight control surfaces are controlled by electrically-powered actuators. The example electrical system 110 provides power to the actuator(s). For example, FIG. 1 shows an example actuator 114 used to move a flight control surface 116 (e.g., an aileron) on the first wing 104 of the aircraft 100. Further, the aircraft 100 can include one or more sensors, displays, communication devices (e.g., a radio), positioning systems, and/or other electrical devices. The electrical system 110 can distribute power to any of these example devices. As another example, the engine may be an electrically-powered motor, which may be powered by the power supply 112. In some examples the power supply 112 includes one or more batteries (e.g., lithium ion batteries). Additionally or alternately, the power supply 112 can be power from a generator driven by a gas powered motor (e.g., the engine). The electrical system 110 distributes or provides electrical power to the one or more components on the aircraft 100. Disclosed herein are example DC-to-DC converters that can be used to step-down or reduce the voltage between a voltage supply, such as the power supply 112, and a load, such as one of the electrical components on the aircraft 100.

Figure 2:
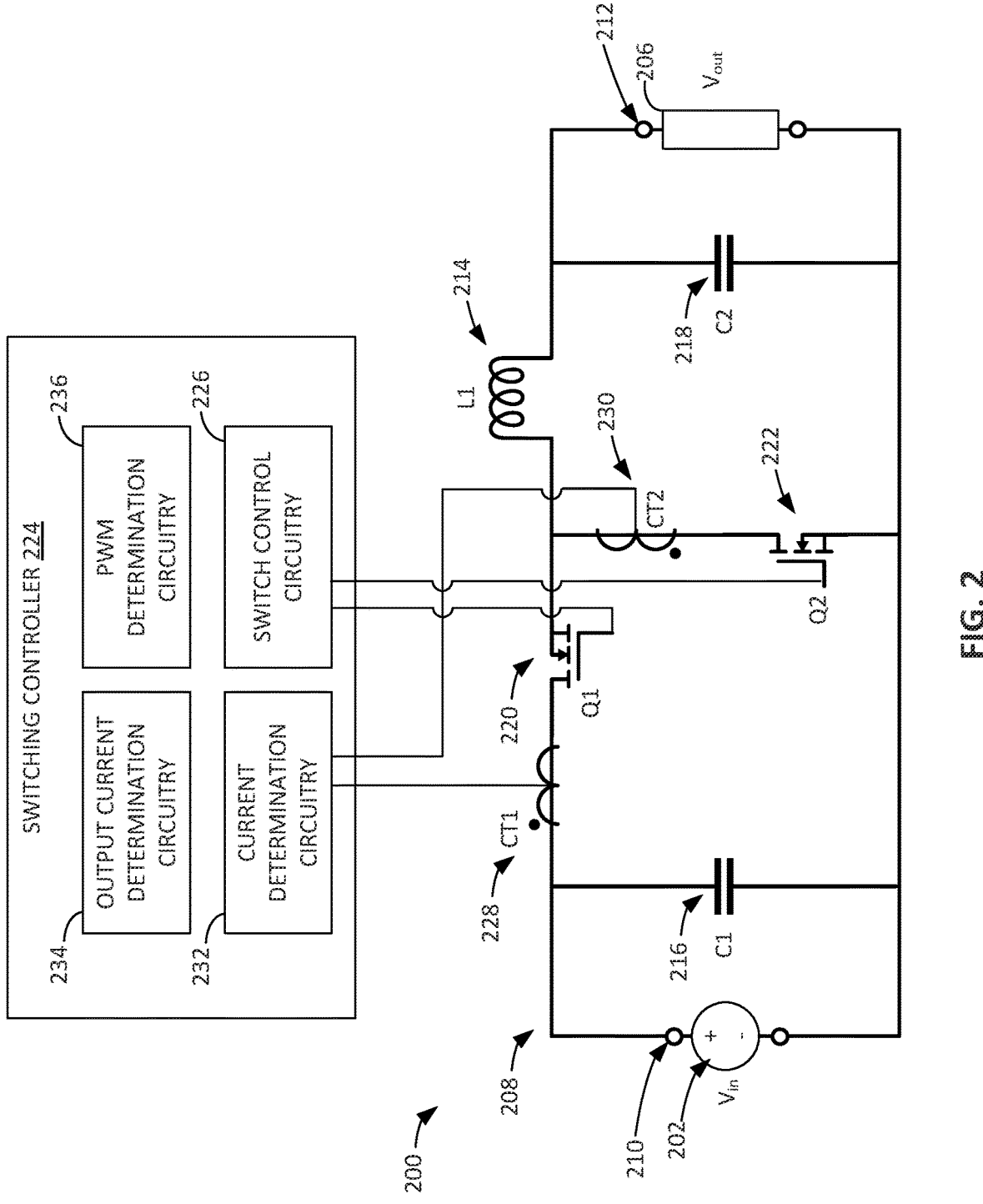
FIG. 2 is a circuit diagram of an example DC-to-DC converter that includes two example current sense transformers.

FIG. 2 is a circuit diagram or topology of an example DC-to-DC converter 200 constructed in accordance with the teachings of this disclosure. The example DC-to-DC converter 200 can also be referred to as a DC-DC or DC/DC converter. In this example, the DC-to-DC converter 200 is a step-down converter, also referred to as a buck converter. The DC-to-DC converter 200 reduces or steps-down DC voltage from a higher voltage at voltage source 202 (labeled $V_{in}$) to a lower output voltage (labeled $V_{out}$) for powering a load 206. The DC-to-DC converter 200 can be used in any power supply system or electrical system for converting a higher DC voltage to a lower DC voltage. For example, the example DC-to-DC converter 200 can be implemented in the electrical system 110 on the example aircraft 100 of FIG. 1. For example, the voltage source 202 can correspond to the power supply 112, and the load 206 can correspond to any of the example electrical components on the aircraft 100, such as the actuator 114 for the flight control surface 116.

In the illustrated example, the DC-to-DC converter 200 includes a circuit 208. The circuit 208 includes an input 210 and an output 212. The input 210 and the output 212 may also be referred to input and output connections, nodes, or terminals, respectively. The input 210 is connected to the voltage source 202 (e.g., the power supply 112), and the output 212 is to be connected to the load 206 that receives the output voltage ($V_{out}$) from the circuit 208. In the illustrated example, the input 210 is connected in series with the output 212. As disclosed in further detail herein, the circuit 208 operates to reduce the voltage between the input 210 (e.g., the power supply 112) and the output 212 (e.g., the load 206).

In the illustrated example, the circuit 208 of the DC-to-DC converter 200 includes an inductor 214 (labeled L1), a first capacitor 216 (labeled C1), a second capacitor 218 (labeled C2), a first switch 220 (labeled Q1), and a second switch 222 (labeled Q2). The first switch 220 and the inductor 214 are connected in series with the input 210 and the output 212. The circuit 208 of the DC-to-DC converter 200 includes multiple branches that form parallel current paths. For example, the first capacitor 216 is connected in parallel with the input 210 and the output 212, the second switch 222 is connected in parallel with the input 210 and the output 212, and the second capacitor 218 is connected in parallel with the input 210 and the output 212.

The first switch 220 can also be referred to as a primary switch and the second switch 222 can be referred to as a secondary or recirculation switch. In this example, the first and second switches 220, 222 are transistors (e.g., metal-oxide-semiconductor field-effect transistor (MOSFETS)). The first and second switches 220, 222 are cycled or switched on (sometimes referred to as closed) and off (sometimes referred to as open). In particular, to operate the DC-to-DC converter 200, the first and second switches 220, 222 are switched on an off in an alternating manner. For example, when the first switch 220 is on, the second switch 222 is off, and when the first switch 220 is off, the second switch 222 is on. The DC-to-DC converter 200 includes an example switching controller 224 (e.g., a PWM controller). The switching controller 224 includes example switch control circuitry 226, which is electrically coupled to the first and second switches 220, 222. The switch control circuitry 226 can turn on and off the switches 220, 222 (e.g., by applying or removing a voltage at the gates of the transistors).

As an example operation, the first switch 220 is initially on (closed) and the second switch 222 is initially off (open). When the first switch 220 is initially switched on (closed), current flows through the first switch 220 and the inductor 214. As the current increases, the inductor 214 produces an opposing voltage across its terminals. This voltage drop across the inductor 214 reduces the net voltage at the output 212 (which results in the reduced voltage). After a period of time, the rate of change of current decreases, and the voltage across the inductor 214 decreases, which increases the voltage at the output 212. During this time, the inductor 214 stores energy in the form of a magnetic field. Then, the first switch 220 is turned off (opened) and the second switch 222 is turned on (closed). As a result, the voltage source 202 is removed from the circuit 208, and the current begins to decrease. The decreasing current produces a voltage drop across the inductor 214, and the inductor 214 becomes a current source. The stored energy in the inductor's magnetic field supports the current flow through the load 206. This current flows through the inductor 214, the load 206, and the second switch 222, which is referred to as a recirculating circuit or path. After a period of time, the first switch 220 is turned on (closed) and the second switch is turned off (open). If the switching occurs before the inductor 214 is fully discharged, the voltage at the load 206 is always greater than zero. In this manner, the DC-to-DC converter 200 reduces the voltage output between the input 210 and the output 212.

The switch control circuitry 226 continuously cycles the first and second switches 220, 222 on and off in an alternating manner. This switching occurs at a relatively high frequency, such as 100 kHz. The switch control circuitry 226 cycles the first and second switches 220, 222 on an off according to a Pulse Width Modulation (PWM) cycle or duty cycle, which corresponds to the amount of time each of the switches 220, 222 is on and off. The PWM or duty cycle can be changed to affect the current and voltage at the load 206.

In some examples, it is advantageous to measure and monitor the output current at the output 212 (e.g., the load 206). This enables the switching controller 224 to control the output current at the output 212 (e.g., the load 206). Known DC-to-DC converters utilize resistive sensors or Hall effect sensors to directly measure the output current at the output 212. However, these types of sensors are complex to implement, require additional space on the electronics board, and require biasing power. Further, resistive sensors are not isolated from the circuit 208. As a result, during a high current load event, the sensors may be overloaded and fail. Also, resistive sensors burn additional power that requires the resistor to be sized appropriately for the power level plus a margin (which can become relatively large). Further, power dissipation in the resistor reduces the efficiency of the converter (i.e., wasted power consumption).

In the illustrated example of FIG. 2, the DC-to-DC converter 200 includes a first current sense transformer 228 (labeled CT1) and a second current sense transformer 230 (labeled CT2). The first and second current sense transformers 228, 230 can be used to measure or sense the current at specific locations of the circuit 208, which can then be used to determine or estimate an output current at the output 212. The first current sense transformer 228 is in a first location and the second current sense transformer 230 is in a second location. In particular, in this example, the first current sense transformer 228 is connected in series with the input 210, the first switch 220, the inductor 214, and the output 212. Further, the first current sense transformer 228 is between the parallel branch having the first capacitor 216 and parallel branch having the second switch 222. The second current sense transformer 230 is connected in series with the second switch 222, and therefore is connected in parallel with the input 210, the first capacitor 216, the second capacitor 218, and the output 212. The switching controller 224 incudes current determination circuitry 232. The current determination circuitry 232 can determine the current at the first current sense transformer 228 based on a measurement from the first current sense transformer 228, and determine the current at the second current sense transformer 230 based on a measurement from the second current sense transformer 230.

Figure 4:
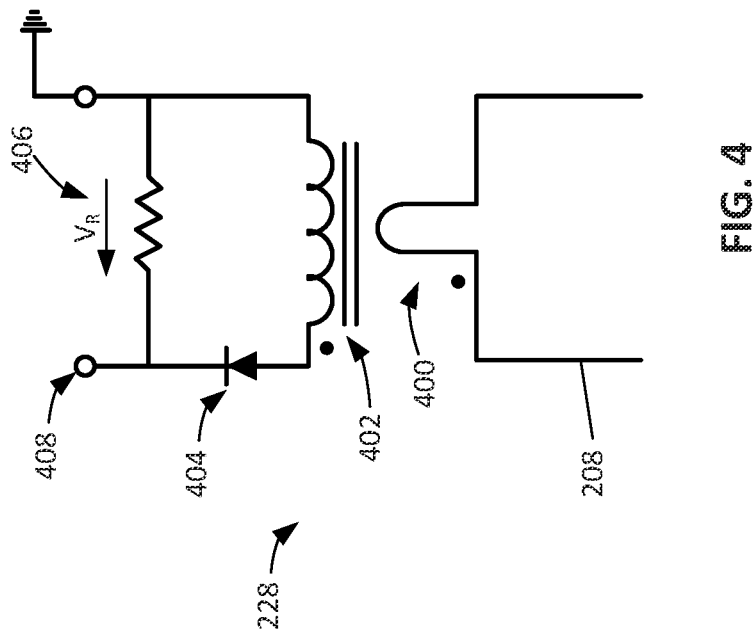
FIG. 4 is a circuit diagram of an example current sense transformer that can be implemented in the example DC-to-DC converter of FIG. 2.

Referring briefly to FIG. 4, an example of the first current sense transformer 228 is shown in more detail. The first current sense transformer 228 includes a primary winding 400 and a secondary winding 402. The primary winding 400 is part of or in electrical circuit with the circuit 208 of the DC-to-DC converter 200. The primary winding 400 has a lower number of turns, such as one or two, while the secondary winding 402 has a higher number of turns (e.g., 10, 20, etc.). The change in current in the primary winding 400 (e.g., as a result of the on/off switching) generates a current in the secondary winding 402. The secondary winding 402 is connected in series with a diode 404 and connected in parallel with a resistor 406 (e.g., a sense (burden) resistor). A terminal or output 408 is electrically coupled to the current determination circuitry 232 (FIG. 2), which measures the voltage $V_R$ across the resistor 406. The voltage $V_R$ correlates to the current in the secondary winding 402 and, thus, the current through the primary winding 400 when current is flowing through the portion of the circuit 208 with the first switch 220. Therefore, the current determination circuitry 232 can determine a first current value (which may be referred to as a switching current) through the circuit 208 at the first current sense transformer 228. While FIG. 4 illustrates one example of a current sense transformer, in other examples, other types of current sense transformers can be used.

Current sense transformers are relatively simple, highly-reliable, passive devices that do not require additional biasing and have simplified (if any) support circuitry to operate. Further, as can be appreciated from FIG. 4, the secondary winding 402 is galvanically isolated from the primary winding 400 and, thus, the first current sense transformer 228 is galvanically isolated from the circuit 208 and the voltage source 202. As such, if there is a high current load event in the circuit 208, the first current sense transformer 228 is not overloaded. Therefore, use of the example first current sense transformer 228 is a more reliable approach to determining or measuring the current in the circuit 208 than known techniques.

The second current sense transformer 230 is the same as the first current sense transformer 228. To avoid redundancy, a complete description of the second current sense transformer 230 is not repeated. In a similar manner, the current determination circuitry 232 determines a second current value (which may be referred to as a recirculating current) at the portion of the circuit with the second switch 222 based on the voltage drop across a resistor of the second current sense transformer 230.

Referring back to FIG. 2, the switching controller 224 includes output current determination circuitry 234. The output current determination circuitry 234 determines an estimated output current of the circuit 208 based on the current measurements from the first and second current sense transformers 228, 230. For example, during a first portion (e.g., half) of a PWM cycle of the circuit 208, the first switch 220 is on (closed) and the second switch 222 is off (open). As such, current flows through the first current sense transformer 228 while no current flows through the second current sense transformer 230. Conversely, during a second portion (e.g., half) of the PWM cycle, the second switch 220 is on (closed) and the first switch 220 is off (open). As such, current flows through the second current sense transformer 230 while no current flows through the first current sense transformer 228. Therefore, the current determination circuitry 232 uses the first current sense transformer 228 to determine a first current value during the first portion of the PWM cycle (when current is flowing through the first switch 220), and uses the second current sense transformer 230 to determine a second current value (in the recirculation circuit) during the second portion of the PWM cycle (when current is flowing through the second switch 222). The first current value corresponds to a current flowing in the circuit 208 in series with the load 206, and the second current value corresponds to a current flowing in the circuit 208 in parallel with the load 206. The first and second current values correlate to the total output current of the circuit 208 (as experienced during one PWM cycle). Therefore, in some examples, the output current determination circuitry 234 determines the estimated output current by summing the first current value and the second current value. Therefore, based on the measurements from the first and second current sense transformers 228, 230, the output current determination circuitry 234 can determine an estimated output current of the circuit 208. In some examples, the first and second portions of the PWM cycle corresponds to halves or 50% of the PWM cycle. However, in other examples, the PWM cycle can be changed such that the first and second current sense transformers 228, 230 are on/off for more or less time in each of the PWM cycles. The output current determination circuitry 234 may repeatedly determine the estimated output current for each PWM cycle. In other examples, the output current determination circuitry 234 may determine the estimated output current at another frequency or period (e.g., every other PWM cycle). In some examples, output current determination circuitry 234 averages the sums of multiple current values over multiple PWM cycles (e.g., 10 PWM cycles) to determine the estimated output current.

In the illustrated example, the switching controller 224 includes PWM determination circuitry 236. The PWM determination circuitry 236 can control the PWM cycle based on the estimated output current. For example, based on the estimated output current, the PWM determination circuitry 236 can determine if the PWM cycle should be changed to achieve another desired output current level. If the PWM cycle is to be changed, the switch control circuitry 226 changes the PWM cycle of the switches 220, 222, thereby affecting the output current at the output 212. As such, the example switching controller 224 can reliably sense and control (e.g., limit) the output current of the circuit 208.

In some examples, multiple converters can be configured in series to progressively reduce the voltage to a desired output voltage. For example, multiples ones of the DC-to-DC converter 200 can be configured in series to incrementally reduce the voltage to a lower voltage depending on the requirements of the load 206. Additionally or alternatively, multiple ones of the DC-to-DC converters 200 can be configured in parallel to produce additional current capability.

Figure 3:
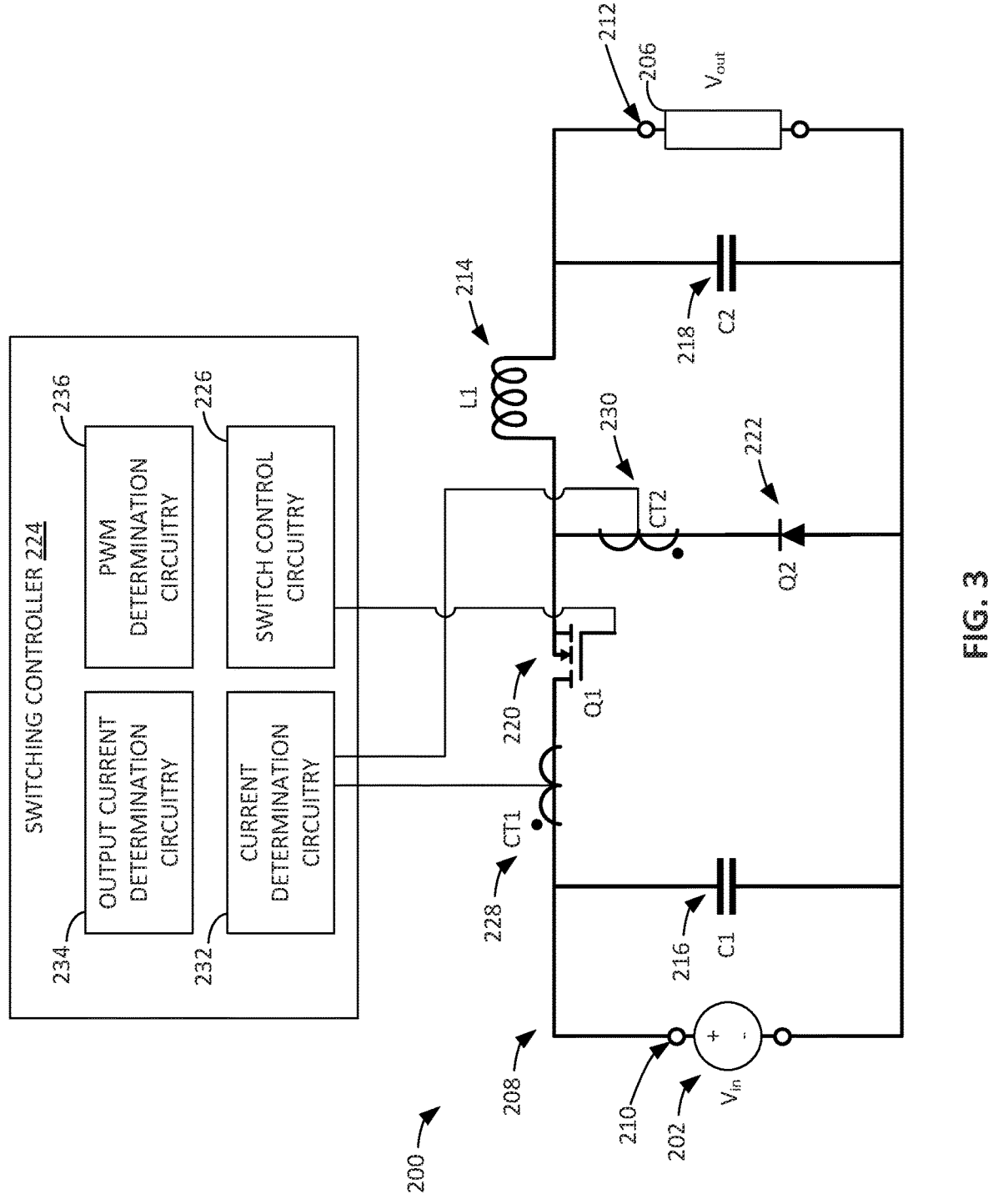
FIG. 3 is a circuit diagram of the example DC-to-DC converter of FIG. 2 in which an example switch is implemented as a diode.

In the example of FIG. 2, the first and second switches 220, 222 are implemented as transistors. These transistors are actively turned on and off by the switch control circuitry 226. This type of arrangement is sometimes referred to as a synchronous converter. However, in other examples, the first and/or second switches 220, 222 can be implemented as other types of switches. For example, FIG. 3 illustrates an example of the DC-to-DC converter 200 in which the second switch 222 is implemented as a diode (e.g., a catch diode). This type of arrangement is sometimes referred to as a non-synchronous converter. Diodes have a turn-on voltage. When the first switch 220 is on and current is flowing through the first switch 220, no current is flowing through the second switch 222 (the diode). However, when the first switch 20 is turned off, the turn-on voltage is exceeded and current flows through the second switch 222 (the diode). Therefore, the example configuration in FIG. 3 operates substantially the same as the configuration in FIG. 3. However, in this example, the switching controller 224 only operates to control the on/off cycle of the first switch 220.

The example switching controller 224 of FIGS. 2 and 3 may be instantiated (e.g., creating an instance of, bring into being for any length of time, materialize, implement, etc.) by programmable circuitry such as a Central Processor Unit (CPU) executing first instructions. Additionally or alternatively, the switching controller 224 of FIGS. 2 and 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of the switching controller 224 may, thus, be instantiated at the same or different times. Some or all of the circuitry of the switching controller 224 may be instantiated, for example, in one or more threads executing concurrently on hardware and/or in series on hardware. Moreover, in some examples, some or all of the switching controller 224 of FIGS. 2 and 3 may be implemented by microprocessor circuitry executing instructions and/or FPGA circuitry performing operations to implement one or more virtual machines and/or containers. In some examples, the circuitry of the switching controller 224 is instantiated by programmable circuitry executing instructions and/or configured to perform operations such as those represented by the flowchart(s) of FIG. 5.

While an example manner of implementing the switching controller 224 is illustrated in FIGS. 2 and 3, one or more of the elements, processes, and/or devices illustrated in FIGS. 2 and 3 may be combined, divided, re-arranged, omitted, eliminated, and/or implemented in any other way. Further, the example switch control circuitry 226, the example current determination circuitry 232, the example output current determination circuitry 234, the example PWM determination circuitry 236 and/or, more generally, the example switching controller 224 of FIGS. 2 and 3, may be implemented by hardware alone or by hardware in combination with software and/or firmware. Thus, for example, any of the example switch control circuitry 226, the example current determination circuitry 232, the example output current determination circuitry 234, the example PWM determination circuitry 236, and/or, more generally, the example switching controller 224, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example switching controller 224 of FIGS. 2 and 3 may include one or more elements, processes, and/or devices in addition to, or instead of, those illustrated in FIGS. 2 and 3, and/or may include more than one of any or all of the illustrated elements, processes and devices.

Flowchart(s) representative of example machine readable instructions, which may be executed by programmable circuitry to implement and/or instantiate the switching controller 224 of FIGS. 2 and 3 and/or representative of example operations which may be performed by programmable circuitry to implement and/or instantiate the switching controller 224 of FIGS. 2 and 3, are shown in FIG. 5. The machine readable instructions may be one or more executable programs or portion(s) of one or more executable programs for execution by programmable circuitry such as the programmable circuitry 612 shown in the example programmable circuitry platform 600 discussed below in connection with FIG. 6. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 5, many other methods of implementing the example switching controller 224 may alternatively be used. For example, the order of execution of the blocks of the flowchart(s) may be changed, and/or some of the blocks described may be changed, eliminated, or combined. Additionally, or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer readable and/or machine readable instructions)

stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry to control or regulate the DC-to-DC converter 200.

As disclosed above, during operation of the DC-to-DC converter 200, the switch control circuitry 226 cycles the first and second switches 220, 222 on and off in an alternating manner at a set frequency (e.g., 100 kHz) and in accordance with a certain PWM or duty cycle. During a first portion (e.g., half) of the PWM cycle, the first switch 220 is on (closed) and the second switch 222 is off (open). As such, current flows through the first switch 220 (which is detected at the first current sense transformer 228), while no current flows through the second switch 222. Conversely, during the second portion (e.g., half) of the PWM cycle, the second switch 222 is on (closed) and the first switch 220 is off (open). As such, current flows through the second switch 222 (which is detected at the second current sense transformer 230), while no current flows through the first switch 220.

At block 502, the current determination circuitry 232 determines a first current value during a first portion of the PWM cycle based on a measurement from the first current sense transformer 228 in the DC-to-DC converter 200. In some examples, the current determination circuitry 232 determines the first current value based on a measured voltage (e.g., across the resistor 406) in the circuit of the first current sense transformer 228. At block 504, the current determination circuitry 232 determines a second current value during a second portion of the PWM cycle based on a measurement from the second current sense transformer 230 in the circuit 208 of the DC-to-DC converter 200. In some examples, the current determination circuitry 232 determines the second current value based on a measured voltage (e.g., across a resistor) in the circuit of the second current sense transformer 230.

At block 506, the output current determination circuitry 234 determines an estimated output current at the output 212 of the DC-to-DC converter 200 based on the measurements from the first and second current sense transformers 228, 230. In some examples, the output current determination circuitry 234 sums the first and second current values (determined at blocks 502, 504) to determine the estimated output current. In some examples, the output current determination circuitry 234 averages the sums of multiple current values over multiple PWM cycles (e.g., 10 PWM cycles) to determine the estimated output current. In other examples, the output current determination circuitry 234 can determine the estimated output current using other techniques.

At block 508, the switch control circuitry 226 controls the PWM cycle of the first switch 220 (and, in some examples, the second switch 222, if implemented by a transistor as in FIG. 2) based on the estimated output current. For example, based on the estimated output current, the PWM determination circuitry 236 may determine whether the PWM cycle should be changed to control or achieve a different output current at the output 212. If the PWM cycle should be changed, the switch control circuitry 226 changes the PWM cycle of the first switch 220 (and, in some examples, the second switch 222, if implemented by a transistor as in FIG. 2). The example process of FIG. 5 can be repeated continuously at a certain frequency.

Figure 6:
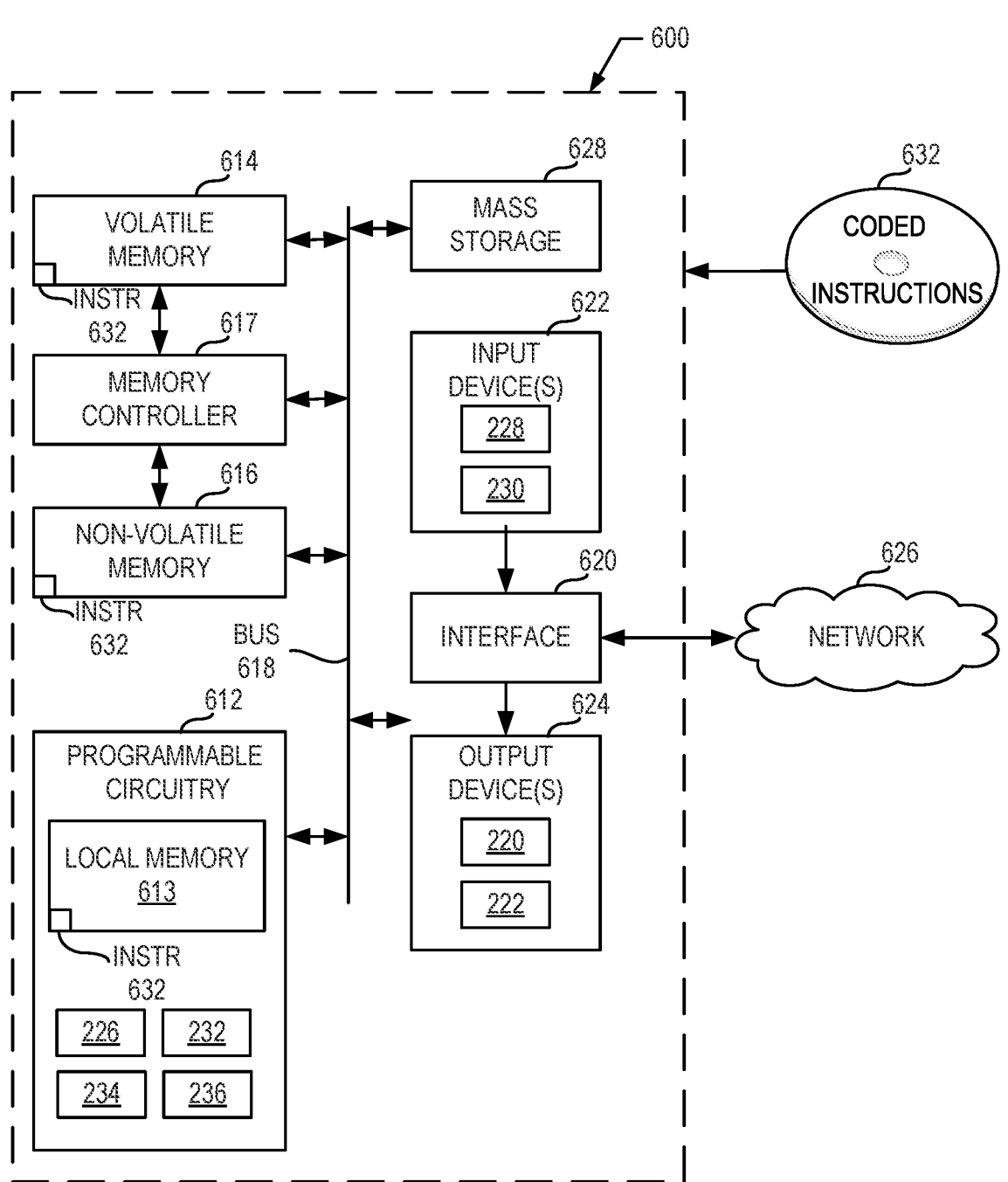
FIG. 6 is a block diagram of an example processing platform including programmable circuitry structured to execute, instantiate, and/or perform the example machine readable instructions and/or perform the example operations of FIG. 5 to implement the example switching controller of FIGS. 2 and 3.

FIG. 6 is a block diagram of an example programmable circuitry platform 600 structured to execute and/or instantiate the example machine-readable instructions and/or the example operations of FIG. 5 to implement the switching controller 224 of FIGS. 2 and 3. The programmable circuitry platform 600 can be, for example, a PWM controller, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the switch control circuitry 226, the example current determination circuitry 232, the example output current determination circuitry 234, the example PWM determination circuitry 236.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can include the first and second current sense transformers 228, 230. Additionally or alternatively, the input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can include the first and second switches 220, 222. Additionally or alternatively, the output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 632, which may be implemented by the machine readable instructions of FIG. 5, may be stored in the mass storage device 628, in the volatile memory 614, in the non-volatile memory 616, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed to accurately sense and control output current of a DC-to-DC converter. The examples disclosed herein utilize current sense transformers in specific locations of a DC-to-DC converter that enables the converter to reconstruct the total output current waveform and, thus, estimate the output current. Current sense transformers are relatively low-cost AC devices that are passive and simpler to implement than known sensors. Further, the example current sense transformers are galvanically isolated from the circuit and, thus, are more reliable during high load events.

Examples and combinations of examples disclosed herein include the following:

Example 1 is a DC-to-DC converter comprising an input connected in series with an output. The input is to be connected to a voltage source and the output is to be connected to a load. The DC-to-DC converter also includes a first switch connected in series with the input and the output, a second switch connected in parallel with the output, a first current sense transformer connected in series the first switch, a second current sense transformer connected in series with the second switch, and a switching controller to determine an estimated output current at the output based on measurements from the first and second current sense transformers.

Example 2 includes the DC-to-DC converter of Example 1, wherein the switching controller is to cycle the first switch on and off according to a pulse width modulation (PWM) cycle.

Example 3 includes the DC-to-DC converter of Example 2, wherein the first current sense transformer is used to determine a first current value during a first portion of the PWM cycle, and the second current sense transformer is used to determine a second current value during a second portion of the PWM cycle.

Example 4 includes the DC-to-DC converter of Example 3, wherein the switching controller is to determine the estimated output current at the output based on a sum of the first current value and the second current value.

Example 5 includes the DC-to-DC converter of Example 4, wherein the switching controller is to control the PWM cycle based on the output current.

Example 6 includes the DC-to-DC converter of any of Examples 1-5, wherein the first and second switches are transistors.

Example 7 includes the DC-to-DC converter of Example 6, wherein the switching controller is to cycle the first and second switches on and off in an alternating manner.

Example 8 includes the DC-to-DC converter of any of Examples 1-5, wherein the second switch is a diode.

Example 9 includes the DC-to-DC converter of any of Examples 1-8, further including an inductor connected in series with the input and the output, a first capacitor connected in parallel with the input, and a second capacitor connected in parallel with output.

Example 10 includes the DC-to-DC converter of any of Examples 1-9, wherein the DC-to-DC converter is a buck converter.

Example 11 includes the DC-to-DC converter of any of Examples 1-10, wherein the load is an actuator on an aircraft.

Example 12 is a non-transitory machine readable storage medium comprising instructions that, when executed, cause programmable circuitry to determine a first current value based on a measurement from a first current sense transformer in a DC-to-DC converter, determine a second current value based on a measurement from a second current sense transformer in the DC-to-DC converter, and determine an estimated output current of the DC-to-DC converter based on the first current value and the second current value.

Example 13 includes the non-transitory machine readable storage medium of Example 12, wherein the measurement from the first current sense transformer occurs during a first portion of a pulse width modulation (PWM) cycle, and the measurement from the second current sense transformer occurs during a second portion of the PWM cycle.

Example 14 includes the non-transitory machine readable storage medium of Examples 12 or 13, wherein the instructions, when executed, cause the programmable circuitry to determine the estimated output current by summing the first current value and the second current value.

Example 15 includes the non-transitory machine readable storage medium of any of Examples 12-14, wherein the DC-to-DC converter includes a switch, and wherein the instructions, when executed, cause the programmable circuitry to control a pulse width modulation (PWM) cycle of the switch based on the estimated output current.

Example 16 is an aircraft comprising a power supply, a load, and a DC-to-DC converter including a circuit to reduce a voltage between the power supply and the load, and a switching controller to determine a first current value of a current flowing in the circuit in series with the load, determine a second current value of a current flowing in the circuit in parallel with the load, and determine an estimated output current of the circuit based on the first current value and the second current value.

Example 17 includes the aircraft of Example 16, wherein the circuit of the DC-to-DC converter includes a first current sense transformer used to measure the first current value and a second current sense transformer used to measure the second current value.

Example 18 includes the aircraft of Example 17, wherein the circuit includes a first switch and a second switch, and wherein the first current sense transformer is connected in series with the first switch and the second current sense transformer is connected in series with the second switch.

Example 19 includes the aircraft of any of Examples 16-18, wherein the load is an actuator to move a flight control surface on the aircraft.

Example 20 includes the aircraft of any of Examples 16-19, wherein the aircraft is an unmanned aerial vehicle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A DC-to-DC converter comprising:
an input connected in series with an output, the input to be connected to a voltage source and the output to be connected to a load;
a first switch connected in series with the input and the output;
a second switch connected in parallel with the output;
a first current sense transformer connected in series the first switch;
a second current sense transformer connected in series with the second switch and in parallel with the output; and
a switching controller to:
determine a first estimated output current at the output based on measurements from the first and second current sense transformers during a first cycle of a pulse width modulation (PWM) cycle;
determine a second estimated output current at the output based on measurements from the first and second current sense transformers during a second cycle of the PWM cycle; and
determine a total output current at the output based on an average of the first estimated output current and the second estimated output current.

2. The DC-to-DC converter of claim 1, wherein the switching controller is to cycle the first switch on and off according to the PWM cycle.

3. The DC-to-DC converter of claim 2, wherein the first current sense transformer is used to determine a first current value during a first portion of the first cycle, and the second current sense transformer is used to determine a second current value during a second portion of the first cycle.

4. A DC-to-DC converter comprising:
an input connected in series with an output, the input to be connected to a voltage source and the output to be connected to a load;
a first switch connected in series with the input and the output;
a second switch connected in parallel with the output;
a first current sense transformer connected in series the first switch;
a second current sense transformer connected in series with the second switch; and
a switching controller to:
cycle the first switch on and off according to a pulse width modulation (PWM) cycle; and
determine an estimated output current at the output based on an average of (a) a sum of a first current value and a second current value, the first current sense transformer used to determine the first current value during a first portion of a first cycle of the PWM cycle, and the second current sense transformer used to determine the second current value during a second portion of the first cycle of the PWM cycle, and (b) a sum of a third current value and a fourth current value, the first current sense transformer used to determine the third current value during a first portion of a second cycle of the PWM cycle, and the second current sense transformer used to determine the fourth current value during a second portion of the second cycle of the PWM cycle.

5. The DC-to-DC converter of claim 4, wherein the switching controller is to control the PWM cycle based on the estimated output current.

6. The DC-to-DC converter of claim 1, wherein the first and second switches are transistors.

7. The DC-to-DC converter of claim 6, wherein the switching controller is to cycle the first and second switches on and off in an alternating manner.

8. The DC-to-DC converter of claim 1, wherein the second switch is a diode.

9. The DC-to-DC converter of claim 1, further including:
an inductor connected in series with the input and the output;
a first capacitor connected in parallel with the input; and
a second capacitor connected in parallel with the output.

10. The DC-to-DC converter of claim 1, wherein the DC-to-DC converter is a buck converter.

11. The DC-to-DC converter of claim 1, wherein the load is an actuator on an aircraft.

12. A non-transitory machine-readable storage medium comprising machine-readable instructions to cause at least one programmable circuit to at least:

determine a first current value based on a measurement from a first current sense transformer in a DC-to-DC converter during a first portion of a first pulse width modulation (PWM) cycle;

determine a second current value based on a measurement from a second current sense transformer in the DC-to-DC converter during a second portion of the first PWM cycle;

determine a first estimated output current of the DC-to-DC converter by summing the first current value and the second current value;

determine a third current value based on a measurement from the first current sense transformer during a first portion of a second PWM cycle;

determine a fourth current value based on a measurement from the second current sense transformer during a second portion of the second PWM cycle;

determine a second estimated output current of the DC-to-DC converter by summing the third current value and the fourth current value; and determine a total output current of the DC-to-DC converter by averaging the first estimated output current and the second estimated output current.

13. An aircraft comprising:

a power supply;

a load; and a DC-to-DC converter including:

a circuit to reduce a voltage between the power supply and the load; and a switching controller to:

determine a first current value of a current flowing in the circuit in series with the load during a first duty cycle;

determine a second current value of a current flowing in the circuit in parallel with the load during the first duty cycle;

determine a first estimated output current of the circuit by summing the first current value and the second current value;

determine a third current value of the current flowing in the circuit in series with the load during a second duty cycle;

determine a fourth current value of the current flowing in the circuit in parallel with the load during the second duty cycle;

determine a second estimated output current of the circuit by summing the third current value and the fourth current value; and determine a total output current based on an average of the first estimated output current and the second estimated output current.

14. The aircraft of claim 13, wherein the circuit of the DC-to-DC converter includes a first current sense transformer used to measure the first current value and a second current sense transformer used to measure the second current value.

15. The aircraft of claim 14, wherein the circuit includes a first switch and a second switch, and wherein the first current sense transformer is connected in series with the first switch and the second current sense transformer is connected in series with the second switch.

16. The aircraft of claim 13, wherein the load is an actuator to move a flight control surface on the aircraft.

17. The aircraft of claim 13, wherein the aircraft is an unmanned aerial vehicle.

18. The non-transitory machine readable storage medium of claim 12, wherein the DC-to-DC converter includes a switch, and wherein the machine-readable instructions are to cause one or more of the at least one programmable circuit to control a third PWM cycle of the switch based on the total output current.

19. The non-transitory machine-readable storage medium of claim 18, wherein the first current sense transformer includes a resistor and the measurement corresponds to a voltage measured across the resistor.

20. The DC-to-DC converter of claim 4, wherein the first current sense transformer includes a first winding, a second winding, and a resistor, the second winding in parallel with the resistor.

* * * * *